Figure 1:
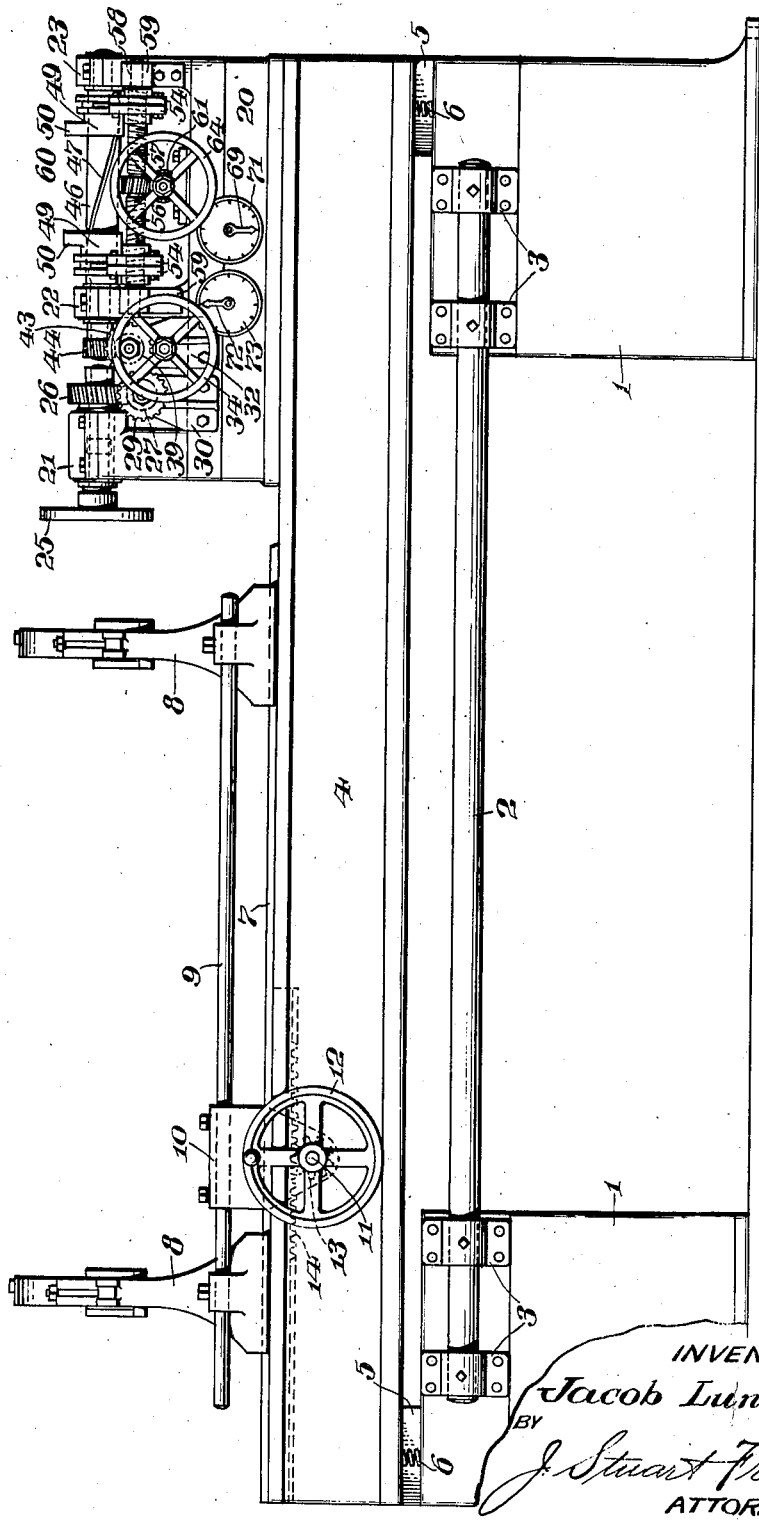

Nov. 10, 1925.

J. LUNDGREN 1,561,177

BALANCING MACHINE

Filed June 4, 1918

3 Sheets-Sheet 2

INVENTOR.
Jacob Lundgren,
BY
ATTORNEY.

Nov. 10, 1925.  
J. LUNDGREN  
BALANCING MACHINE  
Filed June 4, 1918  
1,561,177  
3 Sheets-Sheet 3

INVENTOR  
Jacob Lundgren  
J. Stuart Freeman  
ATTORNEY

Patented Nov. 10, 1925.

1,561,177

UNITED STATES PATENT OFFICE.

JACOB LUNDGREN, OF PHILADELPHIA, PENNSYLVANIA, ASSIGNOR TO CARLSON-WENSTROM CO., A CORPORATION OF DELAWARE.

BALANCING MACHINE.

Application filed June 4, 1918. Serial No. 238,138.

*To all whom it may concern:*

Be it known that I, JACOB LUNDGREN, a citizen of the United States, residing at Philadelphia, in the county of Philadelphia and State of Pennsylvania, have invented certain new and useful Improvements in Balancing Machines, of which the following is a specification.

The object of this invention is to provide an improved balancing machine, especially designed to indicate the absence of static balance in a rotatable body, and as well the degree of static balance thereof, while said body is rotating.

It has long been the custom to determine this type of balance, within certain very restricted ranges of accuracy, by means of level parallel edges, upon which the rotatable body is carefully laid, either directly, or by means of a supporting shaft. With this arrangement the body being tested has a tendency to roll, until its heavier side assumes the lowermost possible position.

However, it is obvious from well-known physical laws, that there is a certain amount of unavoidable friction that cannot be eliminated from between the parallel edges and the surface contacting therewith, and as a result of this inevitable hindrance, even when decreased to the greatest possible extent, the heaviest side of the body being tested will not in every case infallibly stop at the one lowermost position, thus making such a test liable to too great a degree of inaccuracy where a maximum degree of static balance is required.

Obviously, some types of rotatable bodies, especially those designed to revolve at low speeds, and of relatively light weight, can for all intents and purposes be balanced upon the so-called "parallels", and the almost certain existence of residual unbalance will not operate harmfully, or with deteriorating effect, upon the bearings, foundations, and other elements in conjunction with which the body is designed to be run in actual or commercial practice.

However, on the other hand, there are bodies which, though relatively light in weight, are designed to revolve at high speeds, and there are bodies which, though designed to run at but low speeds, are relatively heavy, both of which types must be balanced statically with absolute accuracy in order to insure the apparatus of which they are designed to form a part attaining the greatest possible efficiency. Of the first class there are the lighter armatures or rotors of electrical machinery, bowls of cream separators, crank shafts of automobiles and other forms of internal combustion engines, and the like, while of the latter class there are the large rotors of steam turbines, rotors of large electrical machinery, propellers of large ships, and articles of similar size, weight and designed speed of rotation.

For all such rotatable bodies, whether large or small, and whether designed to revolve at high or low speeds, this invention is capable of balancing statically to an infinite degree of accuracy. In the first place, instead of endeavoring to balance the body by gravity with the inevitable inaccuracy of such method, this invention transforms the disturbing cause of unbalance into a centrifugal force by revolving the body while being tested. Then it greatly magnifies this force by increasing the speed of revolution, thus making a relatively slight cause of unbalance of great magnitude and thereby readily visible in its vibration-causing effect, said effect as a result becoming extremely tangible and capable of analysis, minute dissection, and complete elimination.

Furthermore, the testing of the body whose balance is desired is carried out by revolving the same upon an oscillatory mounting, which is so supported as to confine all of the vibrations in one direction and as affecting one element of the mechanism, in addition to giving the vibration-causing effect free reign by the judicious employment of spring and hinge supports, thus eliminating all damping or counteracting of the useful positively indicating vibrations by secondary and induced vibrations of and within other elementary parts of the balancing mechanism as a whole.

The revolving of the body being tested is done in absolute synchronism with a pair of weights, which are so shifted circumferentially with respect to each other as to create a variable centrifugal force, operative to exactly counteract the centrifugal force set up by the unbalancing weight upon or within said body, and thus to positively damp all vibration of the said oscillatory mounting.

Provision is also made for shifting the balancing weights axially with respect to the body being tested, while all are rotating at any desired speed. Also, the said weights are preferably moved longitudinally of their common axis of rotation as they approach, or are separated from, each other circumferentially, and are in their effect the equivalent of a single fixed weight movable radially of its axis of rotation, to vary the centrifugal force set up by it when revolving. Finally, by suitable direct reading devices, the exact location or position and extent of the cause of unbalance, as indicated by the positions of said weights with respect to each other, and jointly with respect to the body being tested, are positively and accurately determined, and said unbalance is then most easily corrected for by either removing material from, or adding the equivalent thereof to, a definite part or parts of the said body.

The operation of this invention comprises the revolvable association of an unbalanced body with the equivalent, as stated, or a radially adjustable weight mounted to revolve upon an axis either parallel, or coincident with, that of the said body, revolving said body and weight in absolute synchronism, so that any unbalance on the part of the body will oscillate the mounting therefore, and then adjusting radially the effective balancing weight, as well as altering its angular relation with respect to that of the body being tested, while both are revolving continuously.

Figure 2:
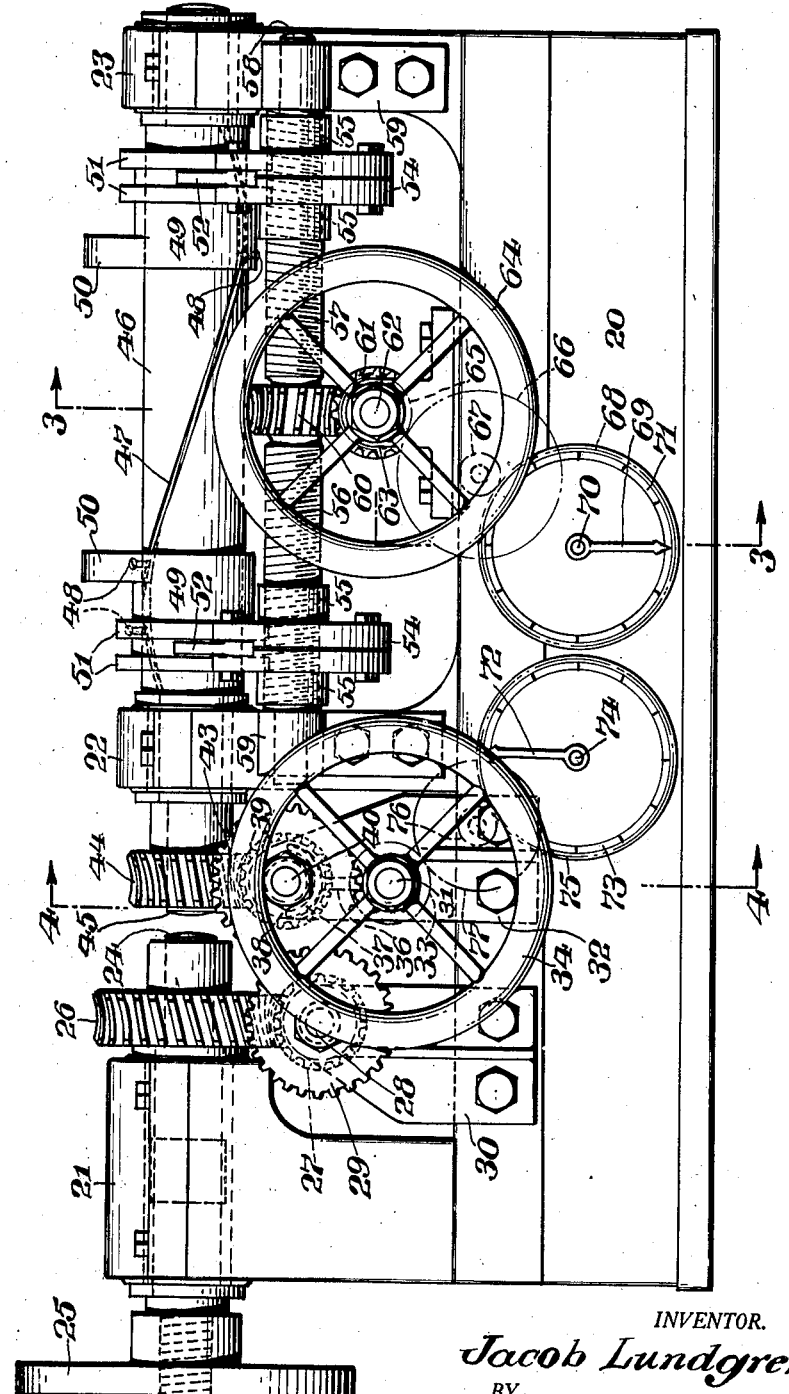
Figure 3:
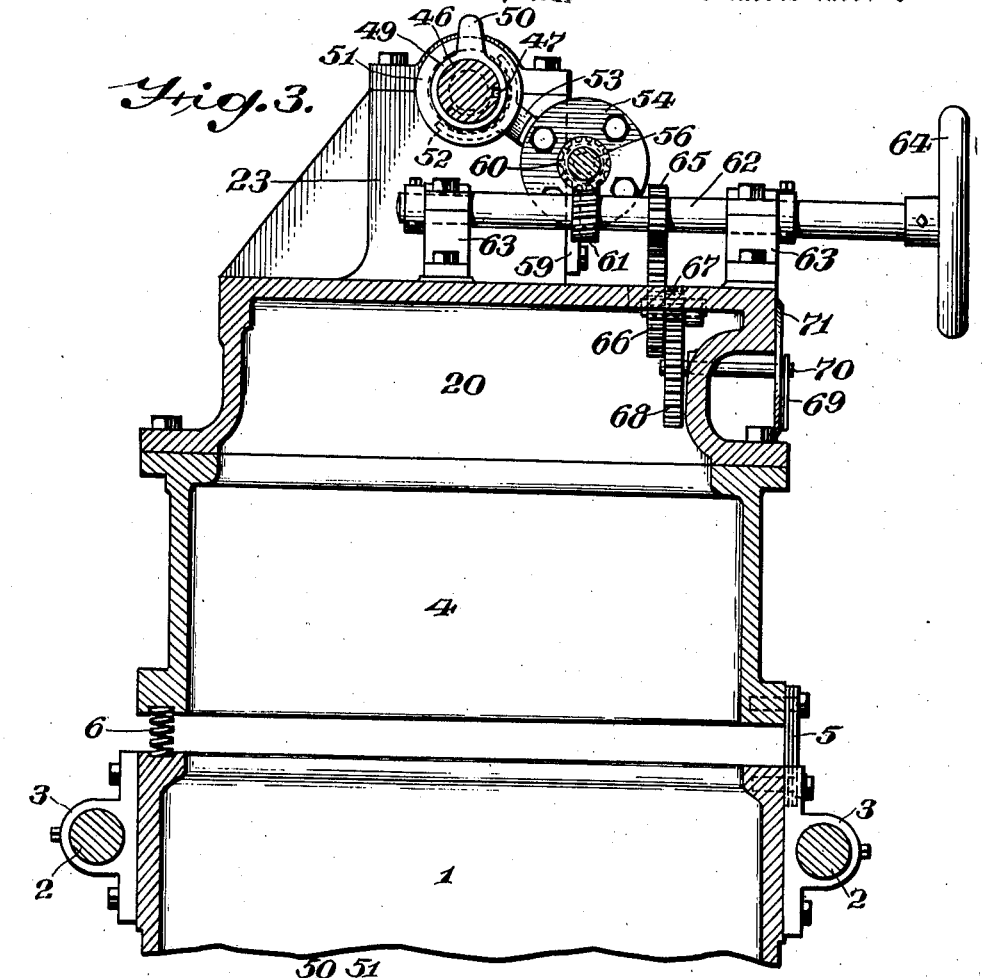
Figure 4:
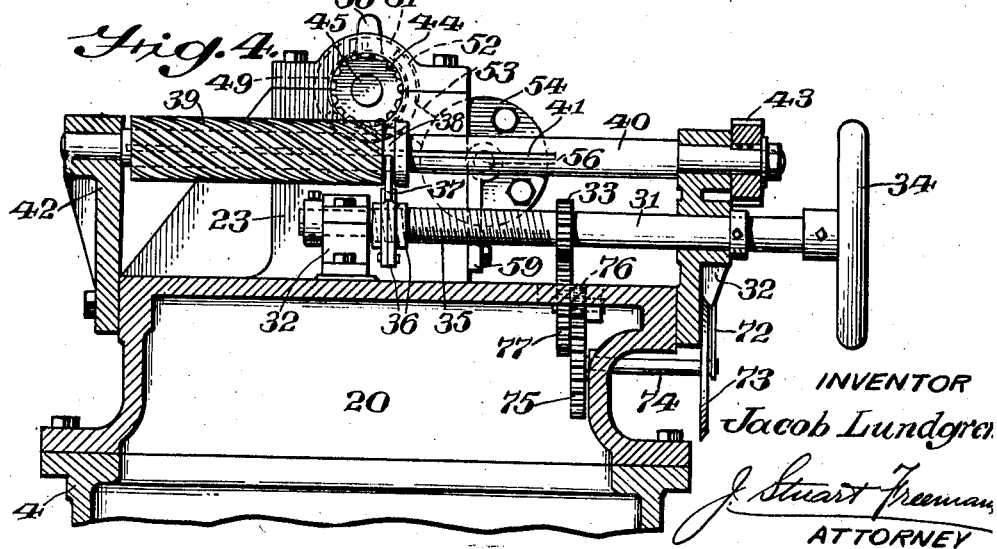

The further details of construction and operation of the invention in its preferred embodiment are fully and clearly brought out in the following description when read in conjunction with the accompanying drawings in which Fig. 1 is a front elevation of the complete machine embodying the preferred form of the invention; Fig. 2 is an enlarged detail elevation of the head-stock and balancing mechanism; Fig. 3 is a vertical transverse section on the line 3—3 of Fig. 2; and Fig. 4 is a similar section on the line 4—4 of Fig. 2.

Referring to the drawings, a base is provided which preferably comprises a pair of spaced upright members 1, which may be secured to a floor or other foundation in any suitable manner, and are maintained with absolute rigidity with respect to each other by means of a pair of horizontal, longitudinally extending bars or rods 2, one connecting the front and the other connecting the rear portions of said base members, and being adjustably yet firmly secured to the latter at their end portions by means of suitable clamps 3.

An oscillatory member 4 is pivotably supported upon, and in spaced relation with, the uppermost portions of the base members 1 by means of spaced resilient hinges 5 at the rear of the device and firmly secured to the members which they connect, while the adjacent forward portions of the members 1 and 4 are yieldingly spaced apart by means of coil-springs or other resilient means 6. The uppermost surface of the oscillatory member 4 is provided with a track 7, upon which is adapted to be slidably mounted one or more supports 8, which may, if desired, be adjustably connected by means of a rod 9, to which is also secured a bracket 10, in turn supporting a shaft 11, which is adapted to be manually revolved by means of a hand-wheel 12, and which also carries a pinion 13 normally engaging the depending rack-teeth 14 of the member 4, whereby, upon rotating the hand-wheel, the bracket 10, rod 9, and the bearings connected thereto, are capable of being shifted as a unit longitudinally of the said oscillatory member.

Preferably at the right hand portion of the machine is provided the head-stock 20, to which are secured three upwardly extending bearing brackets 21, 22 and 23. The first of these brackets provides a bearing through which is journalled a shaft 24, carrying upon its outer end a face-plate, or other suitable means for revolving a body to be tested, while the inner end of said shaft is provided with a worm-gear 26, meshing directly with a worm 27 carried upon the driving shaft 28, which latter also carries a gear 29 and is supported adjacent to its end portions by means of suitable brackets 30, secured at their lowermost portions to the head-stock 20, the motor or other driving means not being shown, said shaft 28 also preferably being that element of the mechanism directly driven by a driving-motor or other suitable mechanism.

A second shaft 31 is shown in Fig. 4 as being supported adjacent to its end portions by means of brackets 32 secured to the head-stock 20, said shaft being provided with a gear 33, while the outermost end of said shaft is provided with a hand-wheel 34, and its innermost portion is provided with screw-threads 35. A removable sleeve 36 is also carried by and is in cooperative engagement with the threaded portion of the shaft 31, and is provided with a pair of spaced fingers or a yoke 37, which slidably engages the side walls of an annular groove 38 in an elongated worm-wheel 39, which latter is provided with an enlarged bore and is adapted to move slidably in a longitudinal direction upon the shaft 40, to which it is secured against relative revolving by means of a well-known type of key and key-way 41, said shaft 40 being supported upon the head-stock 20 by means of the forward bracket 32 and a rearwardly positioned bracket 42, and provided with a gear 43 which is adapted to directly and continuously engage with and be driven by the gear 29.

Meshing with the worm-wheel 39 is a worm-gear 44 secured to one end of a shaft 45, which is journalled through the bearing brackets 22 and 23 and is provided with an enlarged section 46, into the surface of which is cut a spiral key-way 47, in which are slidably positioned keys (invisible) secured by means of screws 48 within the axial bore of each of the sleeves 49, which in turn are identical in size, weight and shape, and are provided with radially extending portions 50, comprising balancing weights and with spaced annular flanges 51 between which are slidably positioned spaced fingers 52 of a yoke member 53.

Said yokes are secured to and moved longitudinally of the shaft 45 by sleeves 54, which are provided with axially positioned internally threaded bores 55 in cooperative engagement with the respective right- and left-hand threaded surfaces 56 and 57 of the shaft 58, which is rotatably supported by means of brackets 59 carried by and extending forwardly from the bearing brackets 22 and 23 respectively, said shaft being also provided centrally with a worm-gear 60 in constant cooperation with a worm-wheel 61 carried by the shaft 62, which in turn is supported by means of brackets 63 upon the uppermost surface of the head-stock 20, said last-named shaft being provided with a hand-wheel 64 and with a gear 65.

The gear 65, carried by the shaft 62, meshes with a gear 66, which in turn, by means of a pinion 67 and gear 68, indicates the direction and extent of movement of the hand-wheel 64 by means of a pointer 69, carried by the shaft 70 which supports the gear 68, said pointer being adapted to revolve, adjacent to a suitably graduated dial 71, and thus positively indicate the positions of the weights 50. The extent of movement of the hand-wheel 34 is indicated by a pointer 72 revolvably positioned adjacent to the graduated dial 73, said pointer being mounted upon a shaft 74, which also carries a gear 75, in turn meshing with a pinion 76, which is adapted to be revolved by a gear 77 meshing with the gear 33, and thus indicate the angular or circumferential relationship of the body being tested with respect to the mean position of the balancing weights 50.

In the operation of this device, a body to be tested is connected to be revolved by the face-plate 25 upon the oscillatory member 4, synchronous with the rotation of which also revolve the weights 50, in close proximity central with respect to the shaft 46. If, as a result of an unbalanced condition of the body being tested, the said member 4 vibrates, an endeavor is made to completely counteract the cause of such unbalance by operating the hand-wheel 64 and thereby reciprocating the members 49 and partially rotating the weights 50 as hereinbefore described.

If the resulting counteracting weight created by the relative movement of the weights 50 does not entirely eliminate all vibration of the oscillatory member, the angular relation of said weights is altered with respect to the body being tested upon their common axis of rotation by actuating the hand-wheel 34 and mechanism connected thereto also as hereinbefore described. Thus, a correlation of the positions of the balancing weights, and a relation of them as a unit axially with respect to the body being tested, will be found at which the cause of unbalance of the said body becomes completely neutralized and all vibration of the oscillatory member ceases.

Having thus described my invention, what I claim and desire to protect by Letters Patent is:

1. A balancing machine, comprising an oscillatory member, a support or attachment for a body to be tested carried by said member, balancing weights also carried by said member, and means to revolve a body upon said support and said weights in synchronism, said weights being simultaneously adjustable in opposite directions circumferentially of their axis of rotation.

2. A balancing machine, comprising an oscillatory member, a support or attachment for a body to be tested carried by said member, balancing weights also carried by said member, and means to revolve a body upon said support and said weights in synchronism, said weights being simultaneously and uniformly adjustable in opposite directions circumferentially of their axis of rotation to create a centrifugal force in opposition to a similar force caused by an unbalanced condition of the body being tested.

3. A balancing machine, comprising an oscillatory member, a support or attachment for a body to be tested carried by said member, balancing weights also carried by said member, and means to revolve a body upon said support and said weights in synchronism, said weights being adjustable longitudinally, and in opposite directions circumferentially, of their axis of rotation.

4. A balancing machine, comprising an oscillatory member, a support or attachment for a body to be tested carried by said member, balancing weights also carried by said member, and means to revolve a body upon said support and said weights in synchronism, said weights being simultaneously adjustable longitudinally, and in opposite directions circumferentially, of their axis of rotation, without altering their effective angular relation with respect to a body upon said support.

5. A balancing machine, comprising an oscillatory member, a support or attachment for a body to be tested carried by said member, balancing weights also carried by said member, and means to revolve a body upon said support and said weights in synchronism, said weights being simultaneously adjustable circumferentially of their axis of rotation, without altering their effective angular relation with respect to a body upon said support.

6. A balancing machine, comprising an oscillatory member, a support or attachment for a body to be tested carried by said member, balancing weights also carried by said member, and means to revolve a body upon said support and said weight in synchronism, said weights being adjustable simultaneously in opposite directions along a spiral path extending about their axis of rotation as a center.

7. A balancing machine, comprising an oscillatory member, a support or attachment for a body to be tested carried by said member, means also carried by said member and operative to create a centrifugal force in opposition to a similar force caused by an unbalanced condition of the body being tested, means to move said first means and the body being tested in unison, a worm-gear connected to each support and said first means, a worm meshing with each of said gears, and means to shift one of said worms longitudinally to alter the angular relation of one of said gears with respect to the other.

8. A balancing machine, comprising an oscillatory member, a support or attachment for a body to be tested carried by said member, means also carried by said member and operative to create a centrifugal force in opposition to a similar force caused by an unbalanced condition of the body being tested, means to move said first means and the body being tested in unison, a worm-gear connected to said first means, a worm meshing with said gear, and means to shift said worm longitudinally to alter the angular relation of said first means with respect to said support or attachment.

9. A balancing machine, comprising an oscillatory member, a support or attachment for a body to be tested carried by said member, means also carried by said member and operative to create a centrifugal force in opposition to a similar force caused by an unbalanced condition of the body being tested, means to move said first means and the body being tested in unison, a worm and worm-gear chain between said support and said first means, and means to shift a worm longitudinally of its axis of rotation to alter the angular relation between said first means and said support or attachment.

10. In a balancing machine of the character described, the combination of a shaft, means to rotate said shaft, a pair of equal test weights mounted on said shaft, and means to adjust both of said weights simultaneously and equally toward and from one another angularly about and during the rotation of said shaft.

11. A balancing machine, comprising a pair of weights, revolvable about a common axis and adjustable angularly about said axis with respect to each other, and supporting means connecting and operative to adjust said weights simultaneously, to effect a result equivalent to the movement of a single weight radially with respect to said axis.

In testimony whereof I have affixed my signature.

JACOB LUNDGREN.